UNITED STATES PATENT OFFICE.

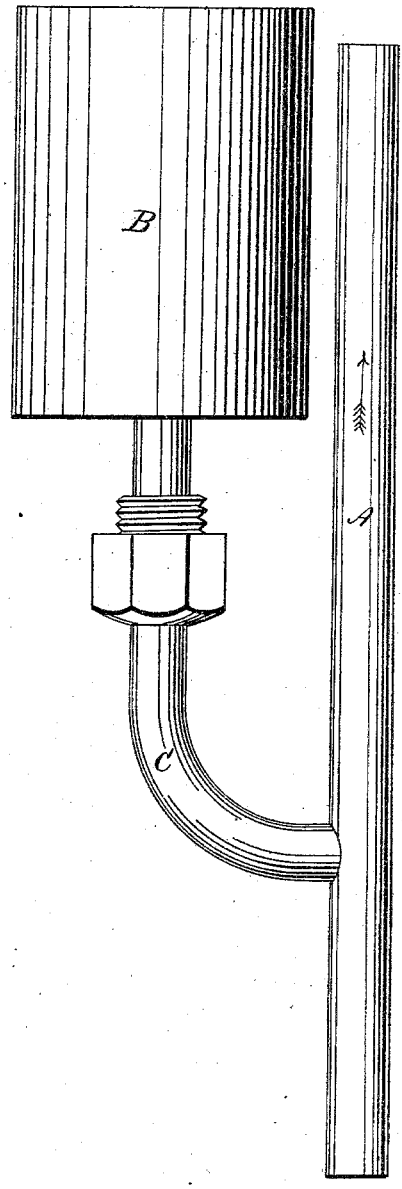

ALBERT R. LAWRENCE, OF SARATOGA SPRINGS, NEW YORK.

IMPROVEMENT IN PREVENTING SEDIMENT IN MINERAL WATERS.

Specification forming part of Letters Patent No. 59,418, dated November 6, 1866.

*To all whom it may concern:*

Be it known that I, ALBERT R. LAWRENCE, of Saratoga Springs, Saratoga county, State of New York, have invented a new and useful process for preventing mineral waters from precipitating the ingredients held in solution in the water and forming sediment, also an apparatus for performing said process; and I do hereby declare the following description and accompanying drawing are sufficient to enable any person skilled in the art or science to which it most nearly appertains to make and use my said invention or improvements without further invention or experiment, and perform said process.

The nature of my invention and improvements consists in mixing with mineral waters a very small quantity of tartaric acid, to prevent precipitation of the ingredients held in solution by the water and forming a sediment; also, in connecting a reservoir of tartaric acid to the pipe which supplies the mineral water, so adjusted as to supply the proper quantity of acid to the mineral water as it runs or is drawn through the pipe which conveys it.

In the accompanying drawing an apparatus is represented for supplying the requisite quantity of tartaric acid to the mineral water to prevent it from precipitating the ingredients held in solution. This apparatus consists of the pipe A, through which the mineral water runs or is drawn in the direction of the arrow. B is a reservoir or vessel, arranged so high that the water in the pipe A will not flow up into it, and connected by the pipe C to the pipe A. In the bottom of reservoir B, or in that part of the pipe C next to it, I put some cotton, sponge, or other filtering material, and fill the reservoir with water in which tartaric acid has been dissolved.

In making the solution of tartaric acid and water to fill the reservoir, I take the tartaric acid of commerce and dissolve it in about sixty (60) times its weight of water, and put the solution into the reservoir B, and arrange and adjust the filtering medium so that as the mineral water runs or is drawn through the pipe A it will draw out of the reservoir and along with it about one (1) per cent. of its own volume of the solution of tartaric acid, which I have found sufficient to prevent the mineral water of Saratoga Springs, in the State of New York, from precipitating the ingredients contained in it and forming a sediment when bottled.

By the term "tartaric acid of commerce" I mean crystallized tartaric acid.

Having described the process which I have invented and the apparatus for performing it, I will now state what I desire to secure by Letters Patent.

What I claim as my invention and improvement in barreling, bottling, and putting up mineral water is—

1. Introducing or mixing a very small quantity of tartaric acid with the water, to prevent precipitation or sediment of the ingredients held in solution in the water.

2. Connecting a reservoir of tartaric acid, or a solution of such acid, to the pipe which supplies the mineral water, so adjusted as to supply the proper quantity of acid to the mineral water (to prevent precipitation or sediment) as the water is drawn through the pipe.

A. R. LAWRENCE.

Witnesses:
JNO. C. HULBERT,
N. C. ALVORD.